(12) United States Patent
Chino

(10) Patent No.: US 10,313,589 B2
(45) Date of Patent: Jun. 4, 2019

(54) IMAGING DEVICE HAVING AN IMAGE MODE SET ACCORDING TO A FILTER

(71) Applicant: CANON KABUSHIKI KAISHA, Tokyo (JP)

(72) Inventor: Shunsuke Chino, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/194,247

(22) Filed: Jun. 27, 2016

(65) Prior Publication Data

US 2017/0006226 A1    Jan. 5, 2017

(30) Foreign Application Priority Data

Jul. 2, 2015  (JP) ................................. 2015-133898

(51) Int. Cl.
*H04N 5/232*    (2006.01)
*H04N 5/225*    (2006.01)
(Continued)

(52) U.S. Cl.
CPC ......... *H04N 5/23245* (2013.01); *G02B 5/208* (2013.01); *G02B 7/006* (2013.01);
(Continued)

(58) Field of Classification Search
CPC ............. H04N 5/23245; H04N 5/2254; H04N 5/23216; H04N 5/23206; H04N 5/2256;
(Continued)

(56) References Cited

U.S. PATENT DOCUMENTS 5,982,423 A * 11/1999 Sekiguchi ............ H04N 5/2254
250/330
7,158,323 B2 * 1/2007 Kim ..................... G02B 26/007
348/235
(Continued)

FOREIGN PATENT DOCUMENTS

JP        H0250580 A     2/1990
JP     2004126416 A     4/2004
(Continued)

*Primary Examiner* — Luong T Nguyen
(74) *Attorney, Agent, or Firm* — Canon U.S.A., Inc. IP Division

(57) ABSTRACT

An imaging device includes a lens unit to form an object image, an imaging unit to convert the formed object image to an image signal, an image processing unit, an insertion/removal unit, a setting unit, and a mode determining unit. The image processing unit performs predetermined image processing on the image signal. The insertion/removal unit inserts and removes optical filters to/from the lens unit. The mode determining unit determines setting of an imaging mode included in a received setting. The optical filters include a first filter having a transmittance of a wavelength component in the infrared region that is relatively smaller than a wavelength component in the visible region, and a second filter having a transmittance of the wavelength component in the infrared region that is relatively larger than the wavelength component in the visible region. The image processing unit performs image processing according to a determination result.

6 Claims, 15 Drawing Sheets

(51) Int. Cl.
*G02B 7/00* (2006.01)
*G02B 5/20* (2006.01)
*H04N 5/235* (2006.01)
*H04N 5/33* (2006.01)

(52) U.S. Cl.
CPC ......... *H04N 5/2254* (2013.01); *H04N 5/2256* (2013.01); *H04N 5/2354* (2013.01); *H04N 5/332* (2013.01); *H04N 5/23206* (2013.01); *H04N 5/23216* (2013.01)

(58) Field of Classification Search
CPC ............ H04N 5/35; H04N 5/33; H04N 5/357; H04N 5/2354; H04N 5/232; G02B 7/006; G02B 5/208
See application file for complete search history.

(56) References Cited

U.S. PATENT DOCUMENTS

| | | | | |
|---|---|---|---|---|
| 2005/0088537 | A1* | 4/2005 | Nakamura | H04N 9/735 348/223.1 |
| 2006/0244583 | A1* | 11/2006 | Kawada | H04N 5/2254 340/468 |
| 2007/0182836 | A1* | 8/2007 | Chino | H04N 5/332 348/273 |
| 2008/0259187 | A1* | 10/2008 | Izawa | G06K 9/2018 348/241 |
| 2011/0228087 | A1* | 9/2011 | Hsieh | C08J 3/201 348/143 |
| 2013/0271562 | A1* | 10/2013 | Kim | H04N 5/332 348/33 |
| 2015/0237321 | A1* | 8/2015 | Sekiguchi | H04N 5/2256 348/164 |
| 2016/0112613 | A1* | 4/2016 | Lee | H04N 5/23245 348/164 |

FOREIGN PATENT DOCUMENTS

| | | |
|---|---|---|
| JP | 2010-068020 A | 3/2010 |
| JP | 2012023606 A | 2/2012 |
| JP | 2012-054904 A | 3/2012 |
| JP | 2012090152 A | 5/2012 |
| JP | 2013222980 A | 10/2013 |

* cited by examiner

*FIG. 7*

| AUTOMATIC DAY/NIGHT MODE |
| --- |
| DAY MODE |
| NIGHT MODE |
| CLEAR IR MODE |

FIG. 14

| Ya/Yb | LIGHT SOURCE |
|---|---|
| 1.0~1.1 | FLUORESCENT LAMP, MERCURY LAMP, SODIUM-VAPOR LAMP, VISIBLE LIGHT LED, ETC. |
| 1.1~1.5 | INCANDESCENT LAMP, SUNLIGHT |
| 1.6~ | INFRARED LAMP |

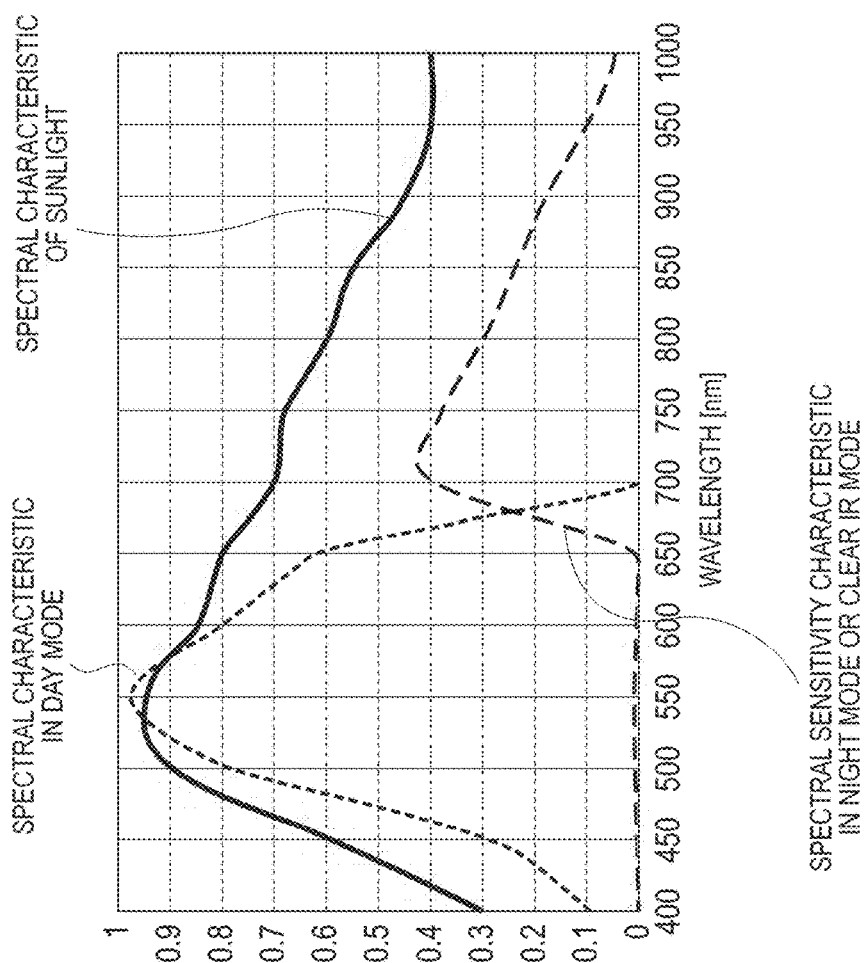

IMAGING DEVICE HAVING AN IMAGE MODE SET ACCORDING TO A FILTER

BACKGROUND OF THE INVENTION

Field of the Invention

The present invention relates to an imaging device, for example an imaging device having an imaging mode set according to a filter.

Description of the Related Art

There has been an imaging device using rectilinear propagation of near-infrared light, blocking visible light from an incident light beam including infrared light, and capturing an image. For example, Japanese Patent Application Laid-Open No. 2012-54904 discloses a technology for performing imaging by inserting a red-color transmitting filter and an infrared transmitting filter according to effective contrast. Further, Japanese Patent Application Laid-Open No. 2010-68020 discloses a technology including a pixel with an infrared filter and a pixel without the infrared filter to enhance a luminance edge component based on an infrared component to a luminance component.

SUMMARY OF THE INVENTION

According to an aspect of the present invention, an imaging device including a lens unit configured to form an object image, and an imaging unit configured to convert the formed object image to an image signal, includes an image processing unit configured to perform predetermined image processing on the image signal captured by the imaging unit, an insertion/removal unit configured to insert and remove a plurality of optical filters to and from the lens unit, a setting unit configured to receive setting from a user, and a mode determining unit configured to determine setting of an imaging mode included in the received setting, wherein the plurality of optical filters includes: a first filter having a transmittance of a wavelength component in the infrared region that is relatively smaller than a wavelength component in the visible region, and a second filter having a transmittance of the wavelength component in the infrared region that is relatively larger than the wavelength component in the visible region, wherein the imaging mode includes: a first imaging mode configured to insert the first filter into the lens unit, a second imaging mode configured to insert the second filter into the lens unit, and a third imaging mode configured to remove the first filter and the second filter from the lens unit, and wherein the image processing unit further is configured to perform image processing according to a determination result of the mode determining unit.

Further features of the present invention will become apparent from the following description of exemplary embodiments (with reference to the attached drawings).

BRIEF DESCRIPTION OF THE DRAWINGS

FIG. 7 is a diagram illustrating a GUI example of mode switching operation.

FIG. 14 is a table illustrating an example of light source estimation based on a change in luminance in switching a filter.

FIG. 18 is a graph illustrating spectral characteristics obtained by multiplying a spectral sensitivity characteristic of a sensor by spectral characteristics of filters, and a spectral characteristic of sunlight.

DESCRIPTION OF THE EMBODIMENTS

Preferable embodiments of the present invention will be described below in detail based on the accompanied drawings.

(First Embodiment)

Figure 1:
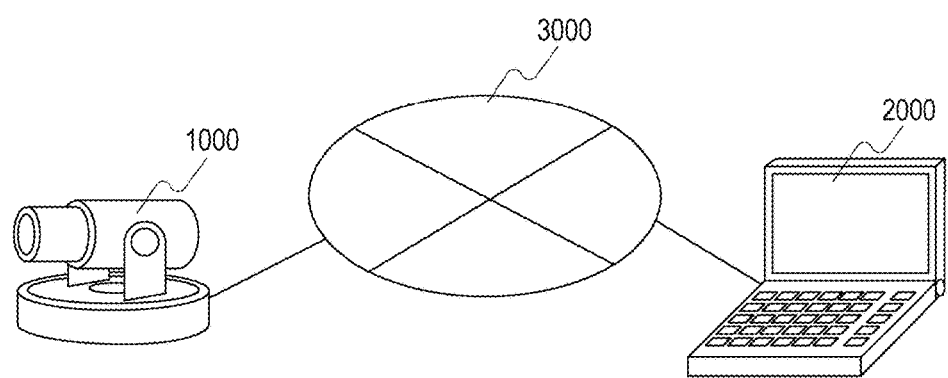
FIG. 1 is a diagram of an imaging system according to an embodiment of the present invention.

FIG. 1 is a diagram of a system including an imaging device 1000. A client device representing an external device according to an embodiment of the present invention is denoted by 2000. The imaging device 1000 and the client device 2000 are communicably connected to each other through a network 3000. The client device 2000 transmits various control commands to the imaging device 1000. The control commands include for example commands for start and finish of imaging, start and finish of distribution of a captured image, or performance of camera control or the like. In addition, the imaging device 1000 receiving each control command transmits to the client device 2000 a response to the received control command.

Note that the imaging device 1000 according to the present embodiment is an example of a communication device communicating with the client device 2000 via the network, and represents for example a monitoring camera imaging a predetermined object. More particularly, the imaging device 1000 according to the present embodiment is a network camera used for monitoring. The client device 2000 according to the present embodiment is an example of an external device such as a PC. Furthermore, a monitoring system including the imaging device 1000 and the external device 2000 according to the present embodiment corresponds to an imaging system.

The network 3000 includes a plurality of routers, switches, cables or the like satisfying a communication standard such as Ethernet (registered trade mark). However, in the present embodiment, any communication standard, size, and configuration can be employed, as long as the imaging device 1000 and the client device 2000 can communicate with each other.

For example, the network 3000 may include the Internet, a wired local area network (LAN), a wireless LAN, a wide area network (WAN), or the like. Note that the imaging device 1000 according to the present embodiment may correspond to, for example, power over Ethernet (PoE (registered trade mark)), and may be powered through a LAN cable.

Figure 2:
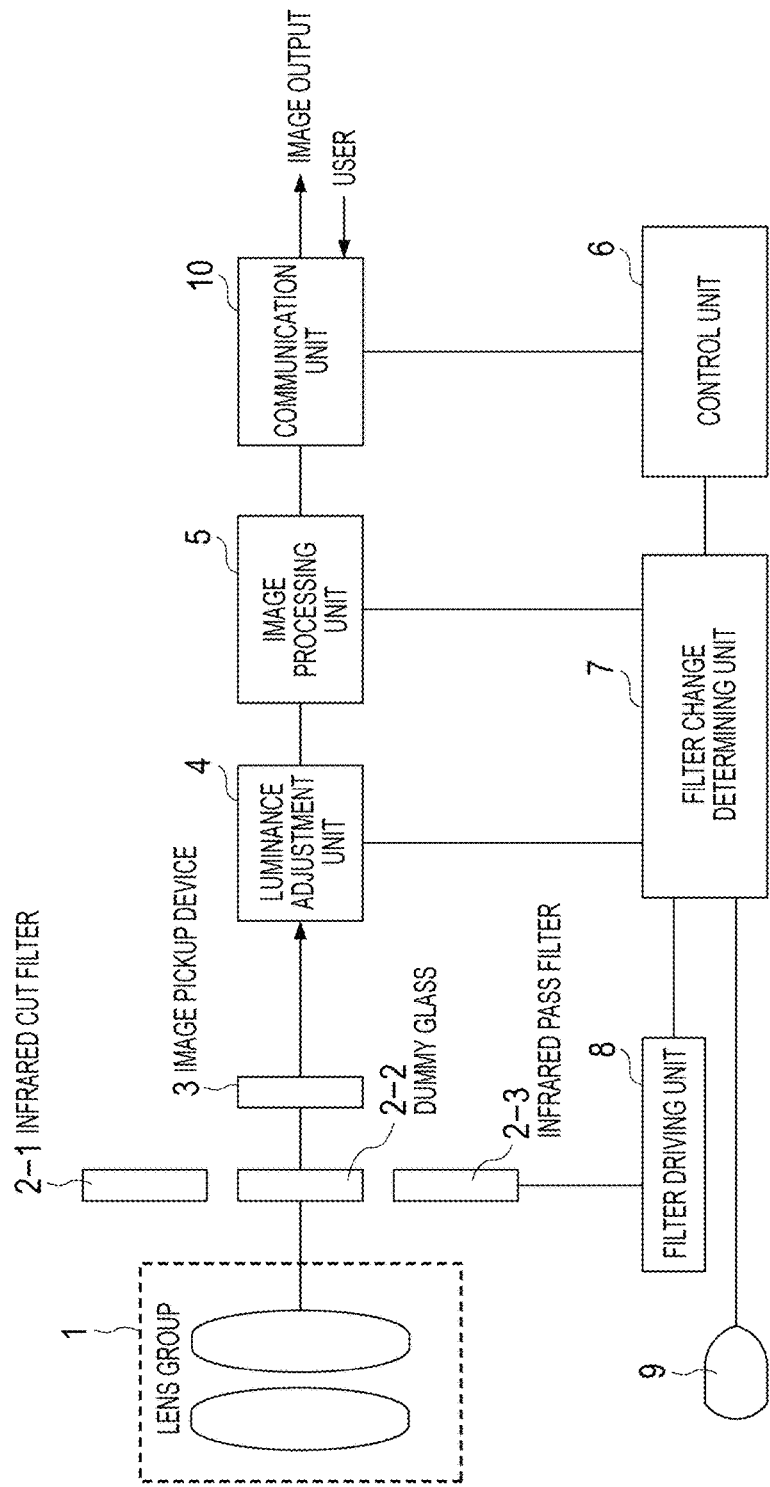
FIG. 2 is a diagram of an imaging device according to a first embodiment of the present invention.

FIG. 2 is a block diagram illustrating an example of a basic configuration of the imaging device 1000 according to a first embodiment of the present invention. An object image, not illustrated, passes through an optical filter, that is, any of an infrared cut filter 2-1, a dummy glass 2-2, and an infrared pass filter 2-3, through a lens group (lens unit) 1, and is made incident on an image pickup device 3 such as a CCD or a CMOS sensor. Note that the image pickup device 3 may have an analog-to-digital converter (ADC), a predetermined signal processing circuit such as an adder/decimator, a defect correction circuit, or the like for signal, in addition to a photoelectric conversion unit for converting light to an electrical signal. In the present invention, the image pickup device 3 corresponds to an imaging unit for converting the object image to an image signal.

The infrared cut filter is denoted by 2-1, and is inserted for an imaging mode for capturing a color image. The infrared cut filter has a transmittance of a wavelength component in the infrared region that is relatively smaller than a wavelength component in the visible region, and is suitable for obtaining color reproducibility closer to human visual characteristics.

The dummy glass is denoted by 2-2, and is used for an imaging mode performing imaging with transmission of visible light and infrared light. Since the dummy glass allows imaging with transmission of both the visible light and the infrared light, the amount of light incident on the image pickup device 3 can be increased, compared with use of the infrared cut filter 2-1 or the infrared pass filter 2-3. However, the dummy glass makes color reproduction difficult due to influence of the infrared light, and the dummy glass is suitable for capturing a monochrome image. The dummy glass may be removed to increase the amount of incident light, but use of the dummy glass can inhibit focus fluctuation due to change in filter thickness caused by changing a filter to another. Alternatively, processing for inhibiting focus fluctuation, such as focus operation, may be performed without inserting the dummy glass 2-2.

The infrared pass filter is denoted by 2-3, and is a filter having a transmittance of a wavelength component in the infrared region that is relatively higher than a wavelength component in the visible region. Imaging performed by inserting the infrared pass filter 2-3 can improve low sharpness, contrast, or the like of a distant object, and thus, the infrared pass filter 2-3 is inserted for an imaging mode for imaging such an object.

A luminance adjustment unit is denoted by 4, and controls a gain value, an aperture, a shutter speed (hereinafter, referred to as SS) or the like according to the amount of light incident on the image pickup device 3 so that a luminance of the object is closer to a target luminance value. The target luminance may be set beforehand, or may be set from outside by a user or the like. Furthermore, an illuminance of the object is calculated based on the set gain value, aperture, or SS, and the calculated illuminance is transmitted to a control unit 6 or a filter change determining unit 7.

An image processing unit is denoted by 5, and the object image formed on the image pickup device 3 is converted to the image signal. Various image processing such as sharpness correction, contrast correction, noise reduction, or color balance adjustment is performed to generate a JPEG image file or the like, and then the image file is output. The image file output from the image processing unit 5 is output to the network via a communication unit 10 mentioned later. The performance and non-performance of the sharpness correction, the contrast correction, or the noise reduction, and setting parameters or the like are set according to an imaging condition such as filter information from the filter change determining unit 7 or the gain value from the luminance adjustment unit 4. The sharpness correction represents correction for extracting an edge (high-frequency component), such as an outline of the object, and enhancing a signal intensity of the edge. Such correction allows clearer recognition of the object. In contrast, the enhancement of the edge may enhance random noise, defects of the image signal, or the like as the high-frequency component. Furthermore, the noise reduction represents correction for example for averaging the image signal within a predetermined range to reduce the random noise or the like in the image. The averaging or the like can reduce noise. The averaging range, weighting for averaging, or the like allows adjustment of noise reduction strength. However, when the noise reduction strength is increased for enhancing noise reduction effect, the outline or the like of the object blurs, and sharpness may be reduced. Thus, sharpness intensity or noise reduction strength needs to be appropriately switched.

The control unit is denoted by 6, and is a CPU for controlling the imaging device 1000. Specifically, the control unit 6 directly or indirectly controls the luminance adjustment unit 4, the image processing unit 5, the filter change determining unit 7, the communication unit 10, or the like. The direct control means controlling components based on a control signal from the control unit 6, and the indirect control means controlling another component through a predetermined component. In addition, the control unit 6 includes a memory, not illustrated. This memory is used as a storage area for the image file generated by the image processing unit 5 or a program executed by the control unit 6 described later, a work area in which a program is executed, or a storage area for various data such as unnecessary light generation condition. The control unit 6 further receives an instruction from the user via the communication unit 10.

The control unit 6 transmits an instruction of changing a filter to the filter change determining unit 7 based on the received instruction. The filter change determining unit 7 determines to change a filter according to the instruction from the control unit 6 or an illuminance of the object from the luminance adjustment unit 4. Determined filter information is transmitted to the image processing unit 5, and various image processing is performed according to each filter. The filter driving unit 8 inserts and removes the infrared cut filter 2-1, the dummy glass 2-2, the infrared pass filter 2-3, or the like, according to control from the filter change determining unit 7, and the optical filters are changed from each other. An infrared lamp is denoted by 9, and whether to emit infrared light is set based on the filter information from the filter change determining unit 7.

The communication unit is denoted by 10, includes an interface connected to the network 3000, and receives a control command including the instruction from the user sent from the external device 2000 and received via the network 3000. After packet processing is appropriately performed on the received control command, contents of the command are determined by the control unit 6. Then, control, parameter setting, or the like is performed on the components of the imaging device 1000, if necessary. The communication unit 10 further outputs, to the network 3000, image data output from the image processing unit 5.

Next, the imaging mode is described in detail. When the infrared cut filter 2-1 is inserted, a light component in the infrared region is cut relative to a light component in the visible region. Therefore, light in the visible region is relatively increased, color closer to human visual characteristics can be reproduced, and a color image can be captured. Hereinafter, this imaging mode is referred to as day mode.

When the dummy glass 2-2 is inserted, light components in the visible region and the infrared region are both transmitted. Since color different from the human visual characteristics is reproduced owing to the light component in the infrared region, the color reproducibility is reduced, and a monochrome image is captured. Hereinafter, this imaging mode is referred to as night mode. The night mode is effective in a low illuminance condition, such as night.

When the infrared pass filter 2-3 is inserted, the light component in the visible region is cut relative to the light component in the infrared region. Therefore, light in the infrared region is relatively increased. This condition is different from the human visual characteristics, and a monochrome image is captured, but the infrared light has a high rectilinear propagation, and is less influenced by atmosphere. Thus, the infrared pass filter 2-3 is suitable for capturing an image of a distant view or a hazy scene. Hereinafter, this imaging mode is referred to as clear IR mode.

Figure 3:
FIG. 3 is a diagram illustrating an image captured in a low illuminance condition before changing to a night mode.
Figure 4:
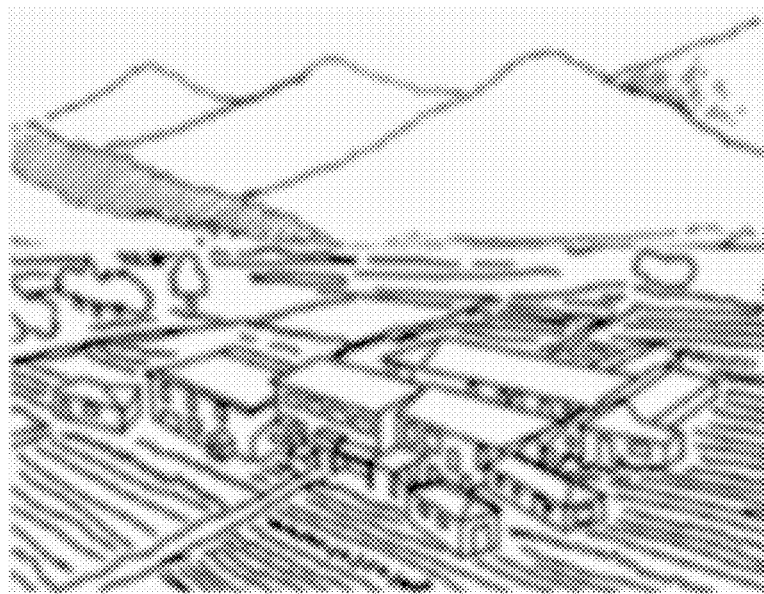
FIG. 4 is a diagram illustrating an image captured in the low illuminance condition after changing to the night mode.

In the day mode or the clear IR mode, light components incident on the lens group 1 are partially cut, so that the light intensity is reduced. When the gain value is increased to compensate for the reduced light intensity, the noise is increased, and the object may not be recognized. In the night mode, the light intensity is less reduced, imaging is allowed in the low illuminance condition, but, in a further low illuminance condition, the setting parameters are changed for the image processing in the image processing unit 5. Specifically, the sharpness intensity is reduced and the noise reduction strength is increased, according to a noise level. The above-mentioned settings can compensate for a reduction in illuminance of the object in the low illuminance condition or the like to improve the image quality. Furthermore, the emission of infrared light by the infrared lamp 9 can further improve the illuminance in the low illuminance condition. As an example, an image in the low illuminance condition captured in the day mode is illustrated in FIG. 3, and the image captured in the night mode is illustrated in FIG. 4.

Figure 5:
FIG. 5 is a diagram illustrating an image captured in a hazy scene before changing to a clear IR mode.
Figure 6:
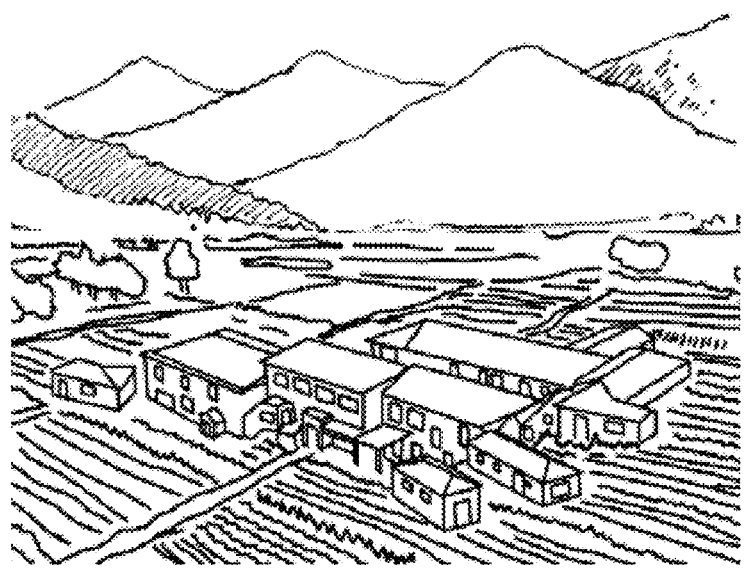
FIG. 6 is a diagram illustrating an image in the hazy scene after changing to the clear IR mode.

In contrast, when a distant view or a hazy scene is imaged in the day mode or the night mode, the captured image may blur or have no contrast as illustrated in FIG. 5, and the captured image may be difficult to be recognized. In such a case, the imaging mode is preferably switched to the clear IR mode. The infrared-pass filter 2-3 used for the clear IR mode mainly takes in near-infrared light, and thus, an image having high sharpness as illustrated in FIG. 6 can be provided owing to high rectilinear propagation of the near-infrared light and improvement in optical aberration. A general lens has an aberration designed to restrict the visible region (approximately 450 [nm] to 700 [nm]), and in the infrared region or the ultraviolet region, the aberration tends to be increased. Thus, insertion of the infrared pass filter allows incidence of only light in the near-infrared region, and the aberration can be reduced. Note that, in the clear IR mode, similar to the night mode, color reproduction is made difficult owing to the light component in the infrared region, so that a monochrome image is output. Since imaging is performed mainly using the infrared light, an amount of light incident on the image pickup device 3 is reduced relative to the night mode. In image processing, in order to increase the recognition of the distant view or the hazy scene, the sharpness intensity is increased and the contrast is increased. Change to the clear IR mode to image the hazy scene can improve the image of FIG. 5 to the image of FIG. 6.

As described above, when a plurality of imaging modes selectively uses the light components in the visible region and the infrared region, the plurality of imaging modes need to be appropriately switched between them depending on the luminance or the kind of object. The appropriate switching between the imaging modes allows imaging effectively using the features of the imaging modes.

Next, switching between the imaging modes will be described in detail. First, setting of the clear IR mode by user's operation is described using a graphical user interface (GUI) example of FIG. 7 and a flowchart of FIG. 8.

FIG. 7 is a diagram illustrating the GUI example in mode switching operation. This GUI is displayed on a display unit, not illustrated, or the like in the client device 2000. The user operating the client device 2000 can operate this GUI using an operation unit (e.g., mouse, joystick, touch panel), not illustrated, to specify an imaging mode. That is, the user can operate the operation unit to operate a button or the like in the GUI illustrated in FIG. 7, in which an imaging mode name is expressed, and an intended imaging mode can be specified. Then, the client device 2000 transmits the control command about the specified imaging mode to the imaging device 1000 via the network. The control unit 6 receiving the control command including information about the specified imaging mode determines the contents of the control command, and operates to set the specified imaging mode.

The imaging device 1000 according to the present embodiment includes a function of an automatic day/night mode. Here, the automatic day/night mode represents a function of automatically switching the day mode and the night mode between them according to the illuminance of the object. Detailed operation of the automatic day/night mode will be described in detail using FIG. 8.

Figure 8:
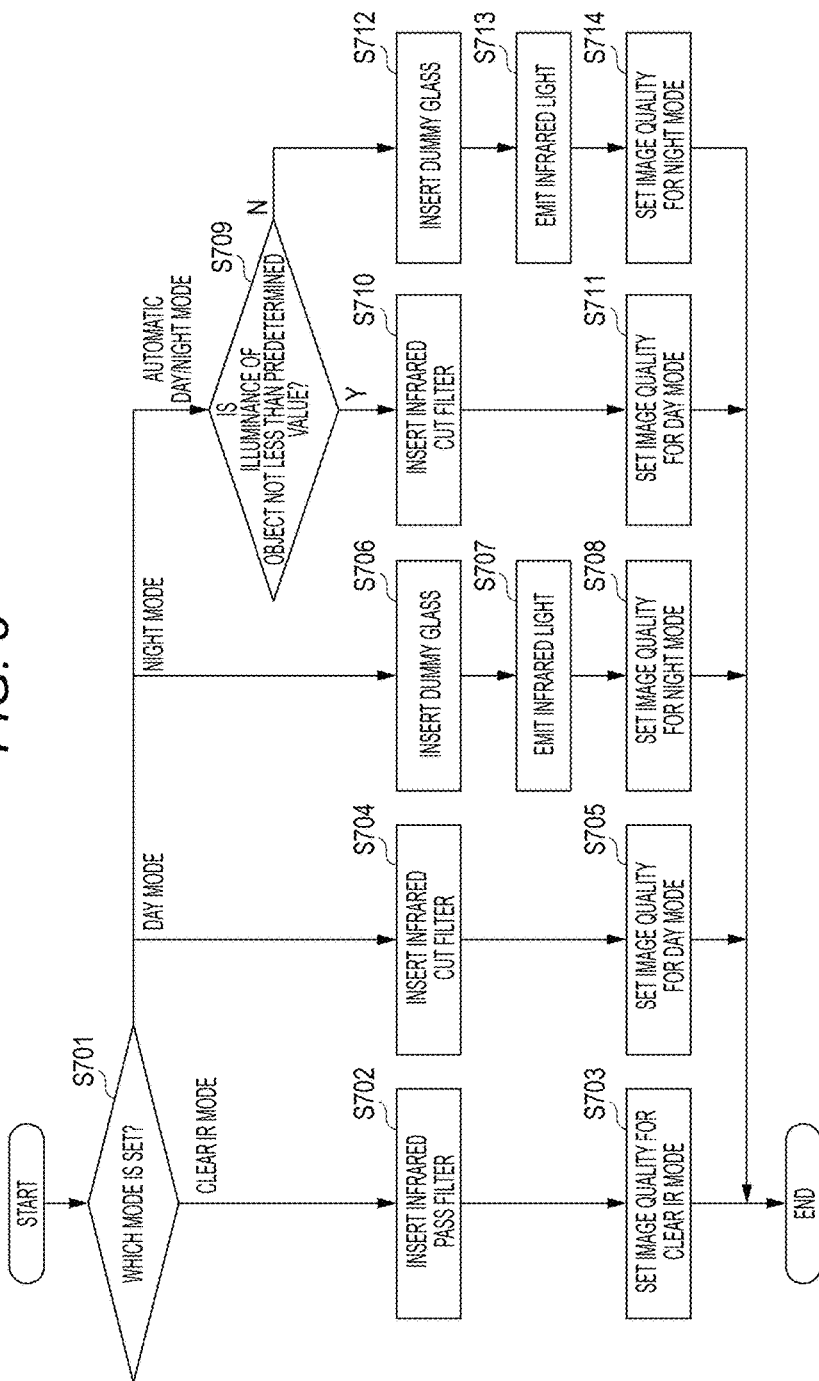
FIG. 8 is a flowchart of a process according to the first embodiment of the present invention.

FIG. 8 is a flowchart illustrating an exemplary processing procedure according to the first embodiment of the present invention. Note that processing of this flowchart is performed by the control unit 6.

When the processing is started, in step S701, the control unit 6 determines a set imaging mode, based on the control command or the like received from the client device 2000. When the clear IR mode is set as a result of the determination, the process proceeds to step S702. When the day mode is set, the process proceeds to step S704. When the night mode is set, the process proceeds to step S706. When the automatic day/night mode is set, the process proceeds to step S709. In the present embodiment, the control unit 6 corresponds to a mode determining unit configured to determine setting of an imaging mode included in settings from the user.

In step S702, the control unit 6 uses the filter driving unit 8 to insert the infrared pass filter 2-3 into an optical path of the lens group 1. Then, the process proceeds to step S703.

In step S703, the control unit 6 changes the setting parameters in the image processing unit 5 to image quality settings for the clear IR mode. Specifically, the sharpness intensity is increased and the contrast is increased. Then the process ends.

In step S704, the control unit 6 uses the filter driving unit 8 to insert the infrared cut filter 2-1 into the optical path of the lens group 1. Then, the process proceeds to step S705.

In step S705, the control unit 6 changes the setting parameters in the image processing unit 5 to image quality settings for the day mode. Specifically, the sharpness intensity is set normally, and the contrast is also set normally. Then the process ends.

In step S706, the control unit 6 uses the filter driving unit 8 to insert the dummy glass 2-2 into the optical path of the lens group 1. Then the process proceeds to step S707.

In step S707, the control unit 6 uses the filter change determining unit 7 to cause the infrared lamp 9 to emit infrared light. Then the process proceeds to step S708.

In step S708, the control unit 6 changes the setting parameters in the image processing unit 5 to image quality settings for the night mode. Specifically, the sharpness intensity is reduced and the noise reduction strength is increased, according to the noise level. Then the process ends. Note that, the infrared lamp 9 is caused to emit infrared light in the night mode, but may emit infrared light in the clear IR mode, or may not emit infrared light in the night mode.

In step S709, the control unit 6 uses the luminance adjustment unit 4 to obtain the illuminance of the object. Then, the control unit 6 determines whether the illuminance is not less than a predetermined value. When the illuminance is not less than the predetermined value, the process proceeds to step S710. When the illuminance is less than the predetermined value, the process proceeds to step S712.

In step S710, the control unit 6 uses the filter driving unit 8 to insert the infrared cut filter 2-1 into the optical path of the lens group 1. Then the process proceeds to step S711.

In step S711, the control unit 6 changes the setting parameters in the image processing unit 5 to the image quality settings for the day mode. Then the process ends.

In step S712, the control unit 6 uses the filter driving unit 8 to insert the dummy glass 2-2 into the optical path of the lens group 1. Then the process proceeds to step S713.

In step S713, the control unit 6 uses the filter change determining unit 7 to cause the infrared lamp 9 to emit infrared light. Then, the process proceeds to step S714.

In step S714, the control unit 6 changes the setting parameters in the image processing unit 5 to the image quality settings for the night mode. Then the process ends.

Next, a description will be made of imaging modes in which the clear IR mode and the night mode are automatically switched between them, in addition to the automatic day/night mode. As described above, the clear IR mode allows clear imaging in a normal luminance condition, but in the low illuminance condition, the amount of light incident on the image pickup device 3 is reduced. In addition, the sharpness intensity is increased and the contrast is increased in the image processing. Therefore, a noise component such as random noise is enhanced, and thus, maintaining the recognition of the object may be difficult. This reduction in amount of light incident on the image pickup device 3 can be improved by switching the clear IR mode to the night mode.

Figure 9:
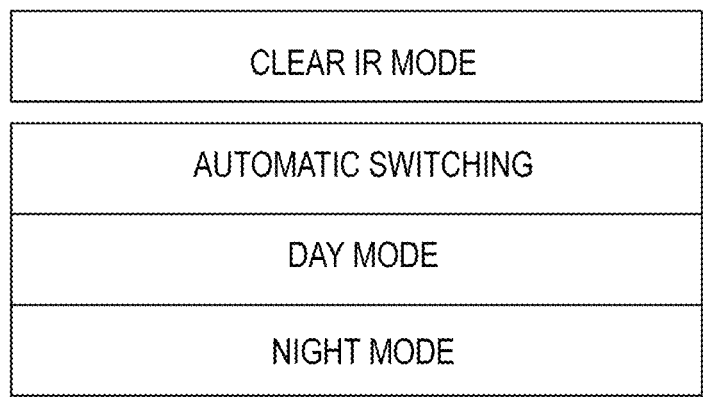
FIG. 9 is a diagram illustrating a GUI example of mode switching operation when the clear IR mode is not selected.
Figure 10:
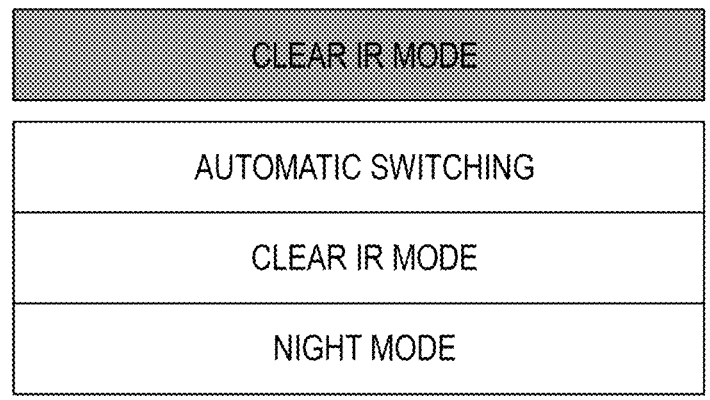
FIG. 10 is a diagram illustrating a GUI example of mode switching operation when the clear IR mode is selected.
Figure 11:
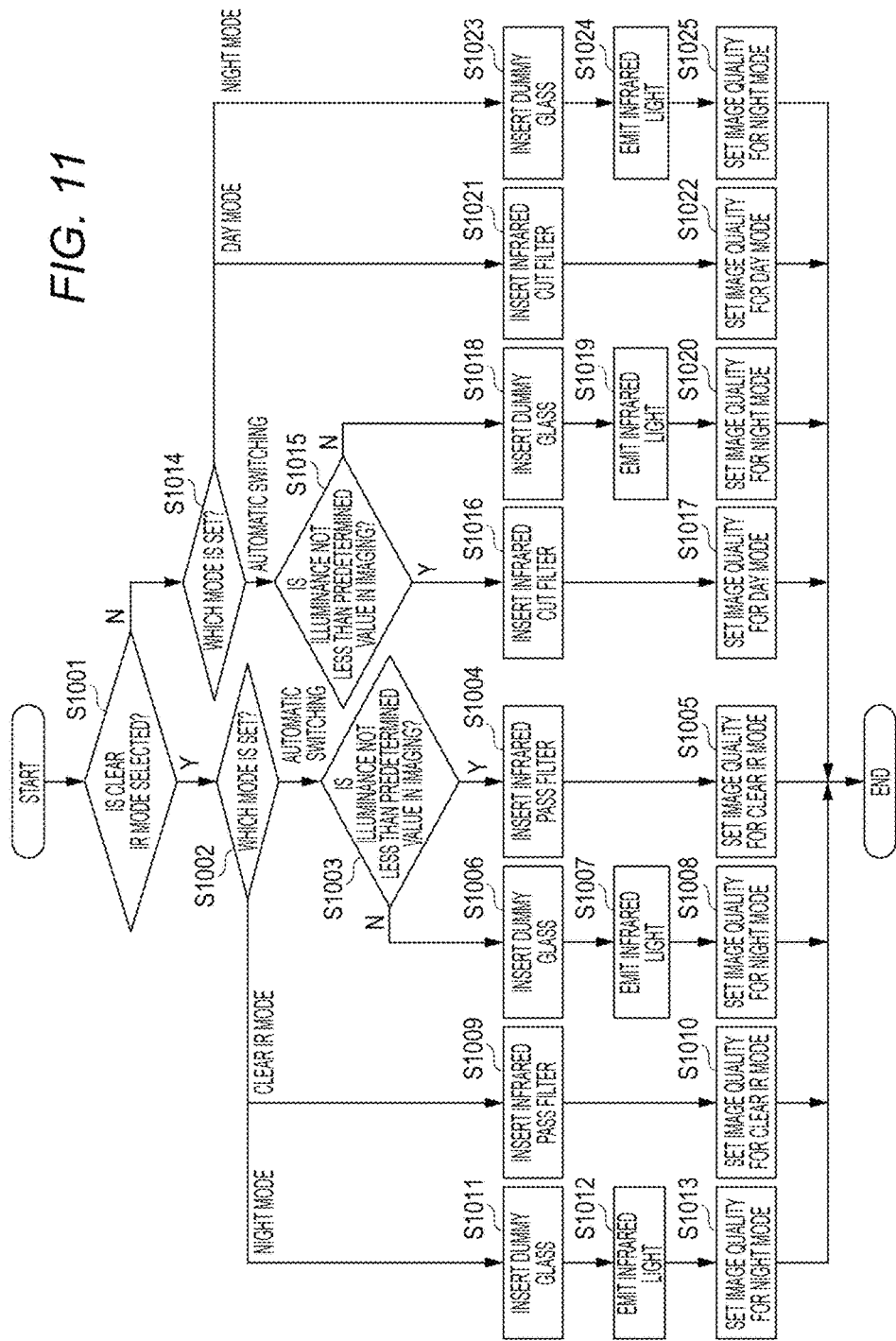
FIG. 11 is flowchart of a process according to the first embodiment of the present invention.

A GUI example having the imaging mode in which the clear IR mode and the night mode are automatically switched between them is illustrated in FIGS. 9 and 10. This GUI is also displayed on the display unit, not illustrated, or the like in the client device 2000. In addition, a flow chart of processing operation of the imaging device 1000 is illustrated in FIG. 11. The imaging device 1000 has the imaging mode in which the clear IR mode and the night mode are automatically switched between them.

FIG. 9 illustrates a state in which the clear IR mode is not selected. When the clear IR mode is not selected, the day mode and the night mode are automatically switched in automatic switching, and the day mode and the night mode can be manually set. FIG. 10 illustrates a state in which the clear IR mode is selected. When the clear IR mode is selected, the clear IR mode and the night mode are automatically switched in the automatic switching, and the clear IR mode and the night mode can be manually set. The selection or non-selection of the clear IR mode can be switched by using the operation unit of the client device 2000, operating a portion of the operation unit representing the clear IR mode. A result of the switching is transmitted as the control command to the imaging device 1000 via the network.

A control process will be described below based on the flowchart of FIG. 11. Note that, processing of this flowchart is performed by the control unit 6.

In step S1001, the control unit 6 determines an imaging mode set in the GUI. More specifically, the control unit 6 analyzes the control command received in the communication unit 10, obtains a content set in the GUI, and determines whether the clear IR mode is selected. When the clear IR mode is selected as a result of the determination, the process proceeds to step S1002, and when the clear IR mode is not set, the process proceeds to step S1014.

In step S1002, the control unit 6 determines an imaging mode set in the GUI. When the automatic switching is set, the process proceeds to step S1003. When the clear IR mode is set, the process proceeds to step S1009. When the night mode is set, the process proceeds to step S1011.

In step S1003, the control unit 6 uses the luminance adjustment unit 4 to obtain the illuminance of the object. Then, the control unit 6 determines whether the illuminance is not less than a predetermined value. When the illuminance is not less than the predetermined value, the process proceeds to step S1004. When the illuminance is less than the predetermined value, the process proceeds to step S1006.

In step S1004, the control unit 6 uses the filter driving unit 8 to insert the infrared pass filter 2-3 into the optical path of the lens group 1. Then, the process proceeds to step S1005.

In step S1005, the control unit 6 changes the setting parameters in the image processing unit 5 to image quality settings for the clear IR mode. Then the process ends.

In step S1006, the control unit 6 uses the filter driving unit 8 to insert the dummy glass 2-2 into the optical path of the lens group 1. Then the process proceeds to step S1007.

In step S1007, the control unit 6 uses the filter change determining unit 7 to cause the infrared lamp 9 to emit infrared light. Then the process proceeds to step S1008.

In step S1008, the control unit 6 changes the setting parameters in the image processing unit 5 to image quality settings for the night mode. Then the process ends.

In addition, when the clear IR mode is determined to be set, in step S1002 in step S1009, the control unit 6 uses the filter driving unit 8 to insert the infrared pass filter 2-3 into the optical path of the lens group 1. Then the process proceeds to step S1010.

In step S1010, the control unit 6 changes the setting parameters in the image processing unit 5 to the image quality settings for the clear IR mode. Then the process ends.

In addition, when the night mode is determined to be set, in step S1002, in step S1011, the control unit 6 uses the filter driving unit 8 to insert the dummy glass 2-2 into the optical path of the lens group 1. Then the process proceeds to step S1012.

In step S1012, the control unit 6 uses the filter change determining unit 7 to cause the infrared lamp 9 to emit infrared light. Then the process proceeds to step S1013.

In step S1013, the control unit 6 changes the setting parameters in the image processing unit 5 to the image quality settings for the night mode. Then the process ends.

Alternatively, in step S1014, the control unit 6 determines an imaging mode set in the GUI. When the automatic switching is set, the process proceeds to step S1015. When the day mode is set, the process proceeds to step S1021. When the night mode is set, the process proceeds to step S1023.

In step S1015, the control unit 6 uses the luminance adjustment unit 4 to obtain the illuminance of the object. Then, the control unit 6 determines whether the illuminance is not less than a predetermined value. When the illuminance is not less than the predetermined value, the process proceeds to step S1016. When the illuminance is less than the predetermined value, the process proceeds to step S1018.

In step S1016, the control unit 6 uses the filter driving unit 8 to insert the infrared cut filter 2-1 into the optical path of the lens group 1. Then the process proceeds to step S1017.

In step S1017, the control unit 6 changes the setting parameters in the image processing unit 5 to the image quality settings for the day mode. Then the process ends.

In step S1018, the control unit 6 uses the filter driving unit 8 to insert the dummy glass 2-2 into the optical path of the lens group 1. Then the process proceeds to step S1019.

In step S1019, the control unit 6 uses the filter change determining unit 7 to cause the infrared lamp 9 to emit infrared light. Then the process proceeds to step S1020.

In step S1020, the control unit 6 changes the setting parameters in the image processing unit 5 to the image quality settings for the night mode. Then the process ends.

In addition, when the day mode is determined to be set, in step S1014, in step S1021, the control unit 6 uses the filter driving unit 8 to insert the infrared cut filter 2-1 into the optical path of the lens group 1. Then the process proceeds to step S1022.

In step S1022, the control unit 6 changes the setting parameters in the image processing unit 5 to the image quality settings for the day mode. Then the process ends.

In addition, when the night mode is determined to be set in step S1014, the control unit 6 uses the filter driving unit 8 to insert the dummy glass 2-2 into the optical path of the lens group 1, in step S1023. Then the process proceeds to step S1024.

In step S1024, the control unit 6 uses the filter change determining unit 7 to cause the infrared lamp 9 to emit infrared light. Then the process proceeds to step S1025.

In step S1025, the control unit 6 changes the setting parameters in the image processing unit 5 to the image quality settings for the night mode. Then the process ends.

Next, automatic switching operation will be described in detail. Hereinafter, the function of automatically switching between the day mode and the night mode will be also referred to as automatic day and night. In addition, hereinafter, the function of switching between the clear IR mode and the night mode will be also referred to as automatic IR night.

Upon imaging in the day mode or the clear IR mode, the illuminance of the object can be calculated based on at least one of the luminance value, aperture, SS, gain value, or the like of the object in a captured image, in the luminance adjustment unit 4. The calculated illuminance of the object and an illuminance YDNth set as a threshold are compared with each other. When the calculated illuminance of the object is not more than YDNth as a result of the comparison, the control unit 6 switches an imaging mode to the night mode.

Figure 12:
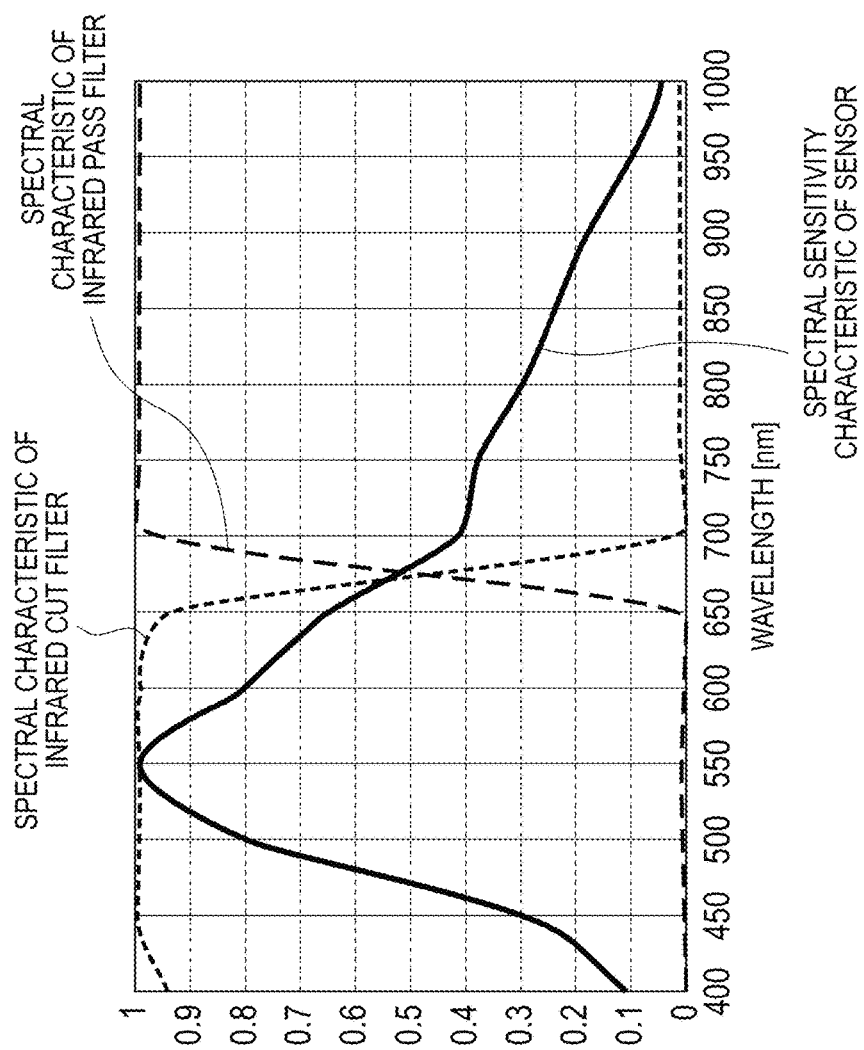
FIG. 12 is a graph illustrating a spectral sensitivity characteristic of a sensor and spectral characteristics of filters.

FIG. 12 illustrates a spectral sensitivity characteristic of the sensor (solid line) taking account of a color filter, a spectral transmittance characteristic of the infrared cut filter 2-1 (dotted line), and a spectral transmittance characteristic of the infrared pass filter 2-3 (broken line). A wavelength range captured is obtained by multiplying the spectral sensitivity characteristic of the sensor and the spectral transmittance characteristic of a filter inserted into the optical path together. Note that, since the dummy glass 2-2 inserted into the optical path transmits light in the whole wavelength region, the wavelength range captured coincides with the spectral sensitivity characteristic of the sensor.

Furthermore, a light intensity used for imaging is calculated based on an area of a graph of a characteristic determined by multiplying the spectral sensitivity characteristic of the sensor and the spectral transmittance characteristic of each filter. Thus, when the imaging mode is the day mode, since the infrared cut filter 2-1 or the infrared pass filter 2-3 is inserted into the optical path, as illustrated in FIG. 12, the wavelength range captured is reduced, and the light intensity used for imaging is reduced. As described above, since switching an imaging mode results into a change in light intensity used for imaging, an illuminance set as a threshold used for switching an imaging mode is required to consider the change in light intensity to prevent hunting caused by switching an imaging mode. Specifically, when the night mode is switched to the day mode or the clear IR mode, generation of the hunting caused by the switching needs to be prevented. Therefore, illuminance YDNth used for switching the night mode needs to be calculated so that the object has a luminance not less than YDNth after switching a filter. That is, YNDth needs to be calculated based on at least one of illuminance after switching to the night mode, the spectral sensitivity characteristic of the sensor taking account of characteristics of the color filter, the spectral characteristic of the infrared cut filter or the infrared pass filter, and spectral characteristics of a light source.

Figure 13:
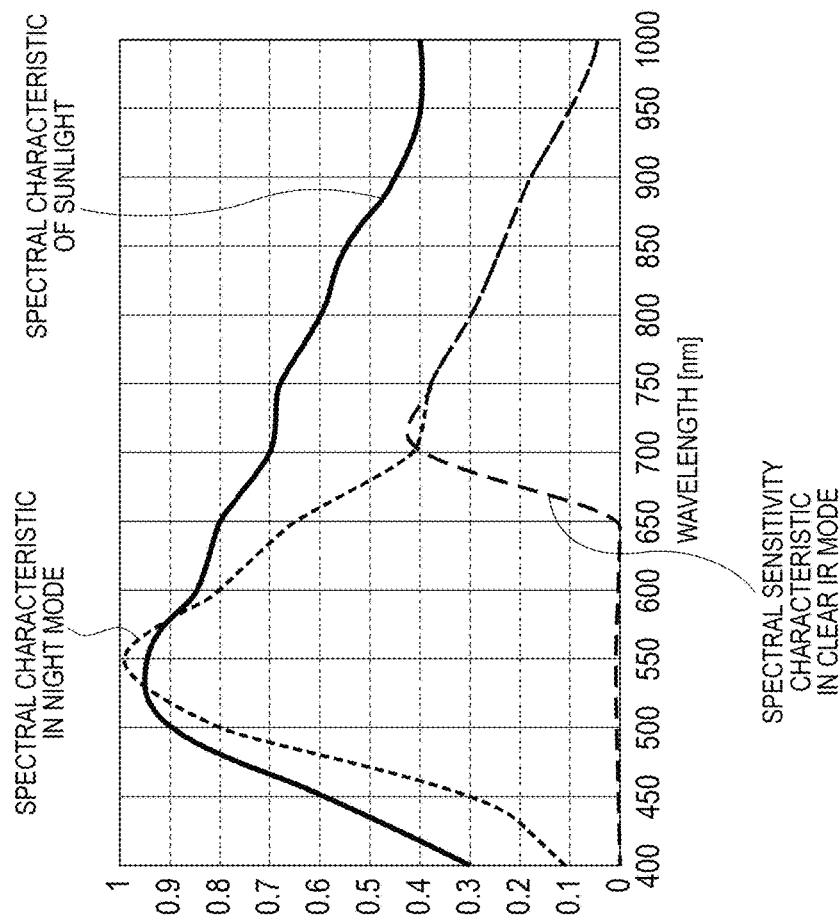
FIG. 13 is a graph illustrating spectral characteristics obtained by multiplying the spectral sensitivity characteristic of the sensor by the spectral characteristics of the filters, and a spectral characteristic of sunlight.

Hereinafter, an example of calculation of YNDth will be described. FIG. 13 illustrates a spectral characteristic of sunlight (light source) (solid line), a spectral sensitivity characteristic in the night mode (dotted line), and the spectral sensitivity characteristic of the sensor (broken line) taking account of characteristics of the color filter upon insertion of the infrared pass filter. Products are obtained by multiplying the spectral characteristic of the light source by a spectral sensitivity characteristic in the clear IR mode, and multiplying the spectral characteristic of the light source by a spectral characteristic in the night mode. Each of the products is integrated with respect to wavelength, and a ratio between the integrated results allows calculation of a sensitivity ratio k1 between the clear IR mode and the night mode. Thus, YNDth can be expressed by the following formula.

$$YNDth = YDNth \times k1 + \alpha \qquad \text{(formula 1)}$$

A letter $\alpha$ is a margin accurately preventing the hunting, or a parameter being set based on image quality upon switching from the night mode. When the night mode in which the infrared cut filter is inserted is switched to the day mode, YNDth can also be calculated by a similar calculation.

Furthermore, in this description, brightness upon switching from the night mode is calculated as represented by formula 1, but the margin for a luminance Ya after switching to the night mode may be changed using k (formula 2).

$$YNDth = Ya + \alpha \times k1 \quad \text{(formula 2)}$$

The light source can be estimated based on a change in luminance after switching form the day mode or the clear IR mode to the night mode. The change in luminance is reduced in magnitude in order of infrared lamp, incandescent lamp or sunlight, fluorescent lamp or mercury lamp, in visible light source. When illuminance before changing a filter is denoted by Yb, and illuminance after changing the filter is denoted by Ya, a table as illustrated in FIG. 14 is obtained by calculation of Ya/Yb, and the light source is calculated based on the table. Furthermore, the kind of light source during white balance can also be estimated based on a ratio between R gain and B gain. A set light source can be also used, as long as the set light source has means such as white balance or focus correction for setting a light source.

When further accurate estimation of the illuminance of the object is desired upon changing a filter for the day mode or the clear IR mode, another illuminance sensor can be provided which has a spectral characteristic closer to an integrated spectral characteristic of the image pickup device 3, and the infrared cut filter or the infrared pass filter.

Furthermore, different image processing of the day mode and the clear IR mode makes noise sensitivity different in the low illuminance condition or the like. Thus, YDNth and YNDth may effectively have different values depending on whether the day mode is selected or the clear IR mode is selected. The sharpness intensity is set larger and the contrast is set larger for the clear IR mode, compared with those for the day mode, and it is commonly preferable that YDNth and YNDth are set larger. Note that, in the present embodiment, the control unit 6 corresponds to a threshold switching unit which switches thresholds used for comparison with the calculated luminance value.

Furthermore, when the infrared lamp 9 emits infrared light to the object in the night mode, the amount of infrared light emitted may be added to a formula calculating a value of k.

Note that, in the present embodiment, the dummy glass 2-2 is used in the night mode, but the infrared cut filter 2-1 and the infrared pass filter 2-3 may be removed from the optical path to cause the image pickup device 3 to receive light without an optical filter.

Preferable embodiments of the present invention have been described above, but the present invention is not limited to these embodiments, and various modifications and variations can be made without departing from the scope and spirit of the present invention.

(Second Embodiment)

Figure 15:
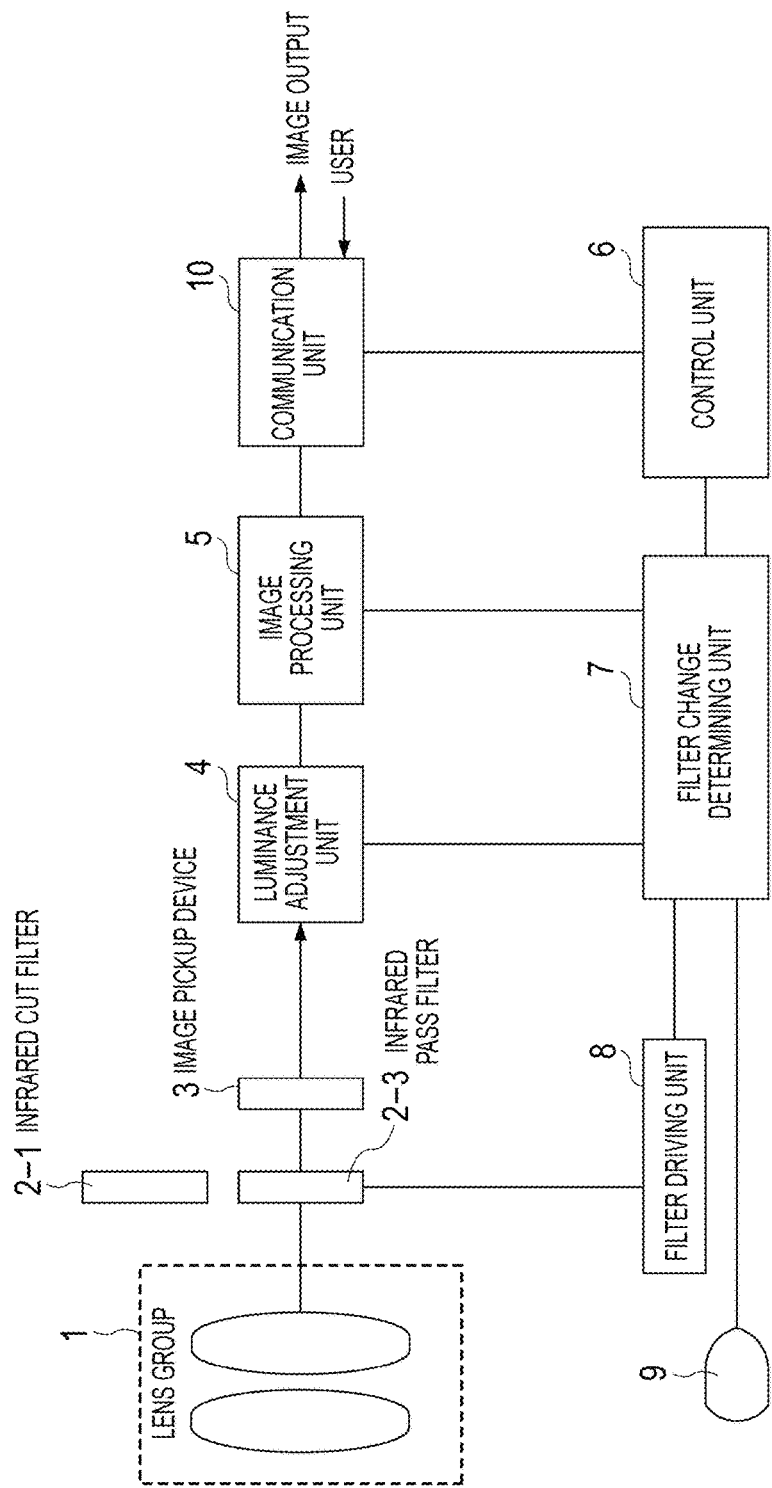
FIG. 15 is a diagram of an imaging device according to a second embodiment of the present invention.

FIG. 15 is a block diagram illustrating an exemplary basic configuration of the imaging device according to a second embodiment of the present invention. Description of configurations similar to those of the first embodiment of the present invention will be omitted. The configuration of the dummy glass 2-2 is eliminated compared with the first embodiment of the present invention. Switching between the imaging modes using two kinds of the infrared cut filter 2-1 and the infrared pass filter 2-3 will be described, in the second embodiment of the present invention.

The imaging modes in the second embodiment will be described in detail below. The second embodiment has three kinds of imaging modes similar to the first embodiment. Specifically, the day mode and the clear IR mode are similar to those of the first embodiment. While, in the night mode, the infrared pass filter 2-3 is selected as a filter to be inserted into the optical path. In addition, emission of infrared light from the infrared lamp 9 compensates for an insufficient amount of incident light to secure the amount of incident light in the night mode. Further, the infrared pass filter 2-3 is inserted into the optical path, but image processing is mainly performed for imaging under low illuminance, similar to the first embodiment, the sharpness intensity is reduced and the noise reduction strength is increased according to a noise level.

Figure 16:
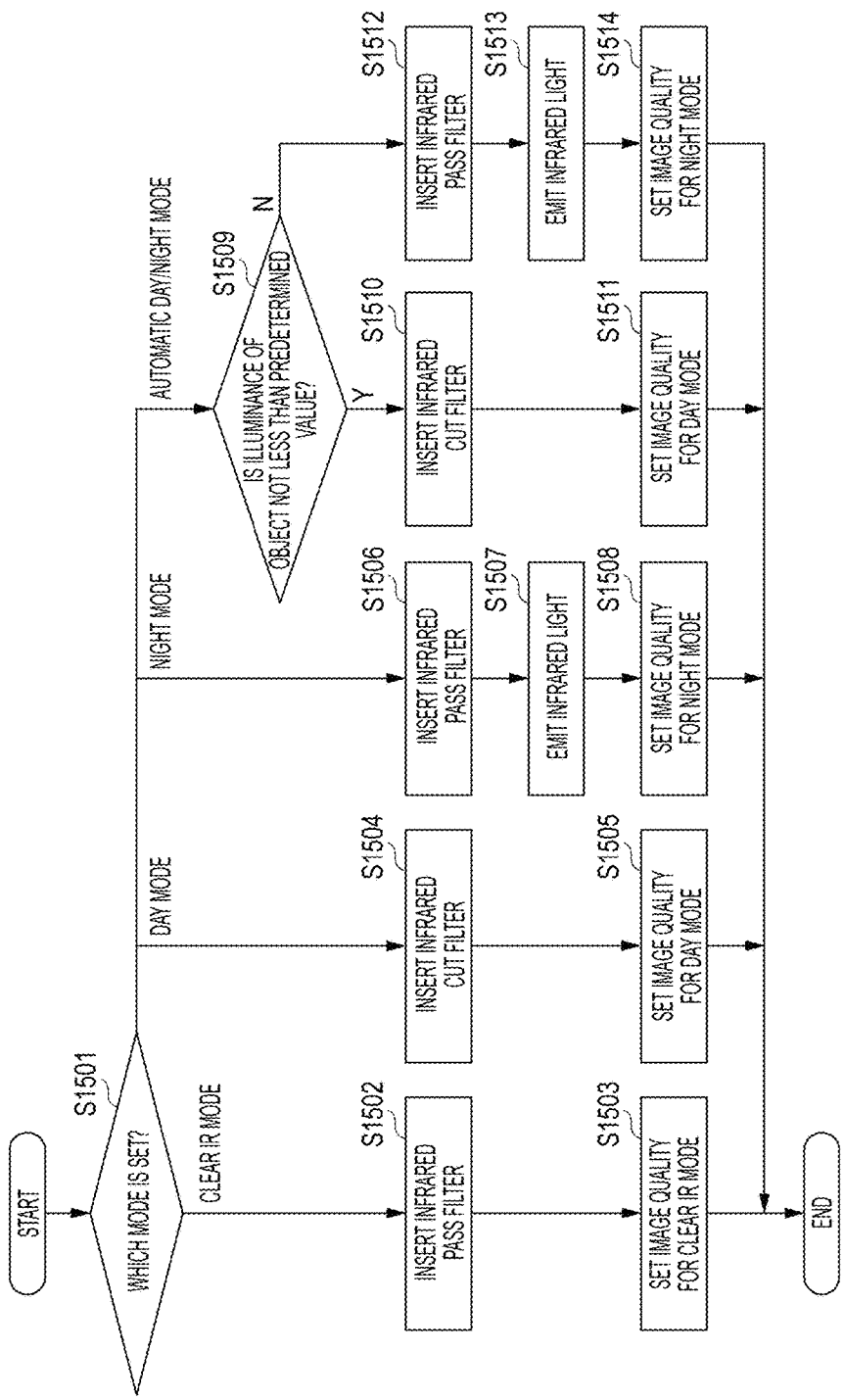
FIG. 16 is a flowchart of a process according to the second embodiment of the present invention.

Next, switching between the imaging modes will be described in detail. Setting of an imaging mode by the user's operation using the GUI illustrated in FIG. 7 will be described using a flowchart of FIG. 16. The GUI example is similar to that of FIG. 7, and description thereof will be omitted. Note that processing of this flowchart is performed by the control unit 6.

When the processing is started, in step S1501, the control unit 6 determines a set imaging mode, based on the control command or the like received from the client device 2000. When the clear IR mode is set as a result of the determination, the process proceeds to step S1502. When the day mode is set, the process proceeds to step S1504. When the night mode is set, the process proceeds to step S1506. When the automatic day/night mode is set, the process proceeds to step S1509.

In step S1502, the control unit 6 uses the filter driving unit 8 to insert the infrared pass filter 2-3 into the optical path of the lens group 1. Then the process proceeds to step S1503.

In step S1503, the control unit 6 changes the setting parameters in the image processing unit 5 to image quality settings for the clear IR mode. Then the process ends.

In step S1504, the control unit 6 uses the filter driving unit 8 to insert the infrared cut filter 2-1 into the optical path of the lens group 1. Then the process proceeds to step S1505.

In step S1505, the control unit 6 changes the setting parameters in the image processing unit 5 to image quality settings for the day mode. Then the process ends.

In step S1506, the control unit 6 uses the filter driving unit 8 to insert the infrared pass filter 2-3 into the optical path of the lens group 1. Then the process proceeds to step S1507.

In step S1507, the control unit 6 uses the filter change determining unit 7 to cause the infrared lamp 9 to emit infrared light. Then the process proceeds to step S1508.

In step S1508, the control unit 6 changes the setting parameters in the image processing unit 5 to image quality settings for the night mode. Specifically, the sharpness intensity is reduced and the noise reduction strength is increased according to the noise level. Then the process ends.

In step S1509, the control unit 6 uses the luminance adjustment unit 4 to obtain the illuminance of the object. Then, the control unit 6 determines whether the illuminance is not less than a predetermined value. When the illuminance is not less than the predetermined value, the process proceeds to step S1510. When the illuminance is less than the predetermined value, the process proceeds to step S1512.

In step S1510, the control unit 6 uses the filter driving unit 8 to insert the infrared cut filter 2-1 into the optical path of the lens group 1. Then the process proceeds to step S1511.

In step S1511, the control unit 6 changes the setting parameters in the image processing unit 5 to the image quality settings for the day mode. Then the process ends.

In step S1512, the control unit 6 uses the filter driving unit 8 to insert the infrared pass filter 2-3 into the optical path of the lens group 1. Then the process proceeds to step S1513.

In step S1513, the control unit 6 uses the filter change determining unit 7 to cause the infrared lamp 9 to emit infrared light. Then the process proceeds to step S1514.

In step S1514, the control unit 6 changes the setting parameters in the image processing unit 5 to the image quality settings for the night mode. Then the process ends.

Next, a description will be made of imaging modes in which the clear IR mode and the night mode are automatically switched between them, in addition to the automatic day/night mode. As described above, the clear IR mode allows clear imaging in the normal luminance condition, but in the low illuminance condition, the amount of light incident on the image pickup device 3 is reduced. Therefore, the sharpness intensity is increased and the contrast is increased in the image processing, and thus, the recognition of the object cannot be maintained due to noise. The reduction in amount of light incident on the image pickup device 3 can be improved by emitting infrared light. The GUI example has a configuration of FIGS. 8 and 9 similar to the first embodiment, and description will be omitted.

Figure 17:
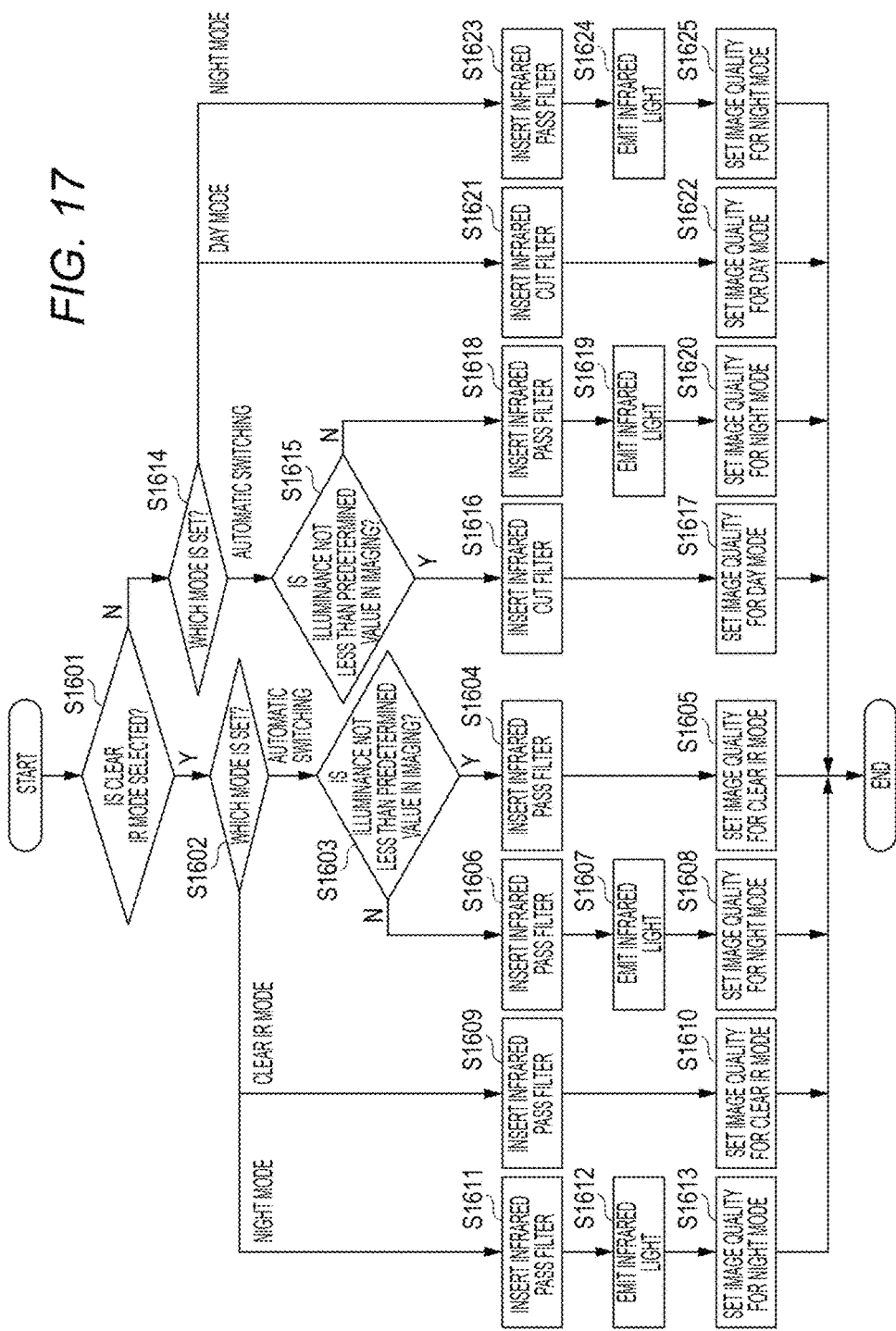
FIG. 17 is a flowchart of a process according to the second embodiment of the present invention.

A control process will be described below based on a flowchart of FIG. 17. Note that processing of this flowchart is performed by the control unit 6.

In step S1601, the control unit 6 determines an imaging mode set in the GUI. More specifically, the control unit 6 analyzes the control command received in the communication unit 10, obtains a content set in the GUI, and determines whether the clear IR mode is selected. When the clear IR mode is selected as a result of the determination, the process proceeds to step S1602, and when the clear IR mode is not set, the process proceeds to step S1614.

In step S1602, the control unit 6 determines an imaging mode set in the GUI. When the automatic switching is set, the process proceeds to step S1603. When the clear IR mode is set, the process proceeds to step S1609. When the night mode is set, the process proceeds to step S1611.

In step S1603, the control unit 6 uses the luminance adjustment unit 4 to obtain the illuminance of the object. Then, the control unit 6 determines whether the illuminance is not less than a predetermined value. When the illuminance is not less than the predetermined value, the process proceeds to step S1604. When the illuminance is less than the predetermined value, the process proceeds to step S1606.

In step S1604, the control unit 6 uses the filter driving unit 8 to insert the infrared pass filter 2-3 into the optical path of the lens group 1. Then the process proceeds to step S1605.

In step S1605, the control unit 6 changes the setting parameters in the image processing unit 5 to image quality settings for the clear IR mode. Then the process ends.

In step S1606, the control unit 6 uses the filter driving unit 8 to insert the infrared pass filter 2-3 into the optical path of the lens group 1. Then the process proceeds to step S1607.

In step S1607, the control unit 6 uses the filter change determining unit 7 to cause the infrared lamp 9 to emit infrared light. Then the process proceeds to step S1608.

In step S1608, the control unit 6 changes the setting parameters in the image processing unit 5 to image quality settings for the night mode. Then the process ends.

In addition, when the clear IR mode is determined to be set, in step S1602, in step S1609, the control unit 6 uses the filter driving unit 8 to insert the infrared pass filter 2-3 into the optical path of the lens group 1. Then the process proceeds to step S1610.

In step S1610, the control unit 6 changes the setting parameters in the image processing unit 5 to the image quality settings for the clear IR mode. Then the process ends.

In addition, when the night mode is determined to be set, in step S1002, in step S1611, the control unit 6 uses the filter driving unit 8 to insert the infrared pass filter 2-3 into the optical path of the lens group 1. Then the process proceeds to step S1612.

In step S1612, the control unit 6 uses the filter change determining unit 7 to cause the infrared lamp 9 to emit infrared light. Then the process proceeds to step S1613.

In step S1613, the control unit 6 changes the setting parameters in the image processing unit 5 to the image quality settings for the night mode. Then the process ends.

Alternatively, in step S1614, the control unit 6 determines an imaging mode set in the GUI. When the automatic switching is set, the process proceeds to step S1615. When the day mode is set, the process proceeds to step S1621. When the night mode is set, the process proceeds to step S1623.

In step S1615, the control unit 6 uses the luminance adjustment unit 4 to obtain the illuminance of the object. Then, the control unit 6 determines whether the illuminance is not less than a predetermined value. When the illuminance is not less than the predetermined value, the process proceeds to step S1616. When the illuminance is less than the predetermined value, the process proceeds to step S1618.

In step S1616, the control unit 6 uses the filter driving unit 8 to insert the infrared cut filter 2-1 into the optical path of the lens group 1. Then the process proceeds to step S1617.

In step S1617, the control unit 6 changes the setting parameters in the image processing unit 5 to image quality settings for the day mode. Then the process ends.

In step S1618, the control unit 6 uses the filter driving unit 8 to insert the infrared pass filter 2-3 into the optical path of the lens group 1. Then the process proceeds to step S1619.

In step S1619, the control unit 6 uses the filter change determining unit 7 to cause the infrared lamp 9 to emit infrared light. Then the process proceeds to step S1620.

In step S1620, the control unit 6 changes the setting parameters in the image processing unit 5 to the image quality settings for the night mode. Then the process ends.

In addition, when the day mode is determined to be set in step S1614, the control unit 6 uses the filter driving unit 8 to insert the infrared cut filter 2-1 into the optical path of the lens group 1 in step S1621. Then the process proceeds to step S1622.

In step S1622, the control unit 6 changes the setting parameters in the image processing unit 5 to the image quality settings for the day mode. Then the process ends.

In addition, when the night mode is determined to be set, in step S1614, in step S1623, the control unit 6 uses the filter driving unit 8 to insert the infrared pass filter 2-3 into the optical path of the lens group 1. Then the process proceeds to step S1624.

In step S1624, the control unit 6 uses the filter change determining unit 7 to cause the infrared lamp 9 to emit infrared light. Then the process proceeds to step S1625.

In step S1625, the control unit 6 changes the setting parameters in the image processing unit 5 to the image quality settings for the night mode. Then the process ends.

Imaging mode switching operation between the automatic day and night and the automatic IR night will be described according to the present embodiment. More specifically, calculation of the illuminance YNDth used for switching an imaging mode will be described in detail below.

FIG. 18 illustrates a spectral characteristic of sunlight as a light source (solid line) and spectral characteristics in respective modes. More specifically, a spectral characteristic in the night mode or the clear IR mode in which the infrared-pass filter is inserted into the optical path is represented by a broken line, and a spectral sensitivity characteristic in the day mode in which the infrared cut filter is inserted into the optical path is represented by a dotted line. Products are obtained by multiplying the spectral characteristic of the light source by a spectral sensitivity characteristic in the day mode, and multiplying the spectral characteristic of the light source by a spectral characteristic in the clear IR mode. Each of the products is integrated with respect to wavelength, and a ratio between the integrated results allows calculation of a sensitivity ratio k2 between the day mode and the night mode. Furthermore, when illuminance of the infrared lamp is estimated based on an illumination setting level, and the amount of light incident on the image pickup device 3 is defined as IR, YNDth can be expressed by the following formula.

$$YNDth = YNDth \times k2 - IR + \alpha \quad \text{(formula 3)}$$

When the infrared cut filter is inserted, YNDth can also be calculated by a similar calculation. A letter α is a margin accurately preventing the hunting, or a parameter being set based on image quality upon switching from the night mode. Switching between the clear IR mode and the night mode according to the second embodiment, the same filter is used, and equation k=1 is satisfied.

Furthermore, in this description, brightness upon switching from the night mode is calculated as represented by formula 3, but the margin for the luminance Ya after switching to the night mode and infrared light is emitted may be changed using k2 (formula 2).

$$YNDth = Ya - IR + \alpha \times k2 \quad \text{(formula 4)}$$

The light source in an imaging environment can be estimated based on a change in luminance after switching from the day mode or the clear IR mode to the night mode. The luminance change is reduced in magnitude in order of infrared lamp, incandescent lamp or sunlight, fluorescent lamp or mercury lamp in visible light source. When illuminance before changing a filter is denoted by Yb, and illuminance after changing the filter is denoted by Ya, a table as illustrated in FIG. 14 is obtained by calculation of Ya/Yb, and the light source is calculated based on the table. Furthermore, the kind of light source during white balance can also be estimated based on the ratio between R gain and B gain. A set light source can be also used, as long as the client device 2000 or the like has means for setting light source information used for white balance or focus correction by the user. Switching between thresholds for switching the imaging modes based on a result estimated as described above, can reduce failure such as hunting.

When further accurate estimation of the illuminance of the object is desired upon changing a filter for the day mode or the clear IR mode, another illuminance sensor can be provided which has a spectral characteristic closer to an integrated spectral characteristic of the image pickup device 3, and the infrared cut filter or the infrared pass filter.

Furthermore, different image processing of the day mode and the clear IR mode makes noise sensitivity different in the low illuminance condition or the like. Thus, YDNth and YNDth may effectively have different values depending on whether the day mode is selected or the clear IR mode is selected. The sharpness intensity is set larger and the contrast is set larger for the clear IR mode, compared with those for the day mode, and it is commonly preferable that YDNth and YNDth are set larger.

Preferable embodiments of the present invention have been described above, but the present invention is not limited to these embodiments, and various modifications and variations can be made without departing from the scope and spirit of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-133898, filed Jul. 2, 2015, which is hereby incorporated by reference herein in its entirety.

What is claimed is:
1. An imaging device including a lens group configured to form an object image, and an imaging sensor configured to convert the formed object image to an image signal, the imaging device comprising:
one or more processors; and
memory storing instructions that, when executed by the one or more processors, cause the imaging device to perform operations including:
inserting and removing a plurality of optical filters to and from the lens group,
setting one of a first imaging mode, a second imaging mode, and a third imaging mode,
performing noise reduction processing on the image signal according to a set imaging mode,
switching a threshold based on the set imaging mode,
comparing an illuminance value of the image signal with the threshold to produce a comparison result, and
switching, based on the comparison result, two of the following: the first imaging mode, the second imaging mode, and the third imaging mode, wherein the plurality of optical filters includes:
a first filter having a transmittance of a wavelength component in an infrared region that is smaller than a transmittance of a wavelength component in a visible region, and
a second filter having a transmittance of the wavelength component in the infrared region that is larger than the transmittance of the wavelength component in the visible region, and
wherein the first imaging mode inserts the first filter into the lens group, the second imaging mode inserts the second filter into the lens group, and the third imaging mode removes the first filter and the second filter from the lens group.

2. The imaging device according to claim 1, wherein executing the instructions causes the imaging device to perform operations further including performing sharpness processing corresponding to the set imaging mode on the image signal.

3. The imaging device according to claim 1,
wherein a color image is obtained in the first imaging mode, and
wherein a monochrome image is obtained in the second imaging mode and in the third imaging mode.

4. The imaging device according to claim 1, wherein executing the instructions causes the imaging device to perform operations further including:
estimating a light source in an imaging environment, and
switching the threshold based on an estimation result.

5. The imaging device according to claim 4, wherein estimating includes estimating the light source based on at least one of the following: gain in white balance, light source information, and a change in luminance caused by switching of two of the first imaging mode, the second imaging mode, and the third imaging mode.

6. A method for an imaging device including a lens group configured to form an object image, and an imaging sensor configured to convert the formed object image to an image signal, the method comprising:
inserting and removing a plurality of optical filters to and from the lens group;
setting one of a first imaging mode, a second imaging mode, and a third imaging mode;
performing noise reduction processing on the image signal according to a set imaging mode;
switching a threshold based on the set imaging mode;
comparing an illuminance value of the image signal with the threshold to produce a comparison result; and
switching, based on the comparison result, two of the following: the first imaging mode, the second imaging mode, and the third imaging mode,
wherein the plurality of optical filters includes:
a first filter having a transmittance of a wavelength component in an infrared region that is smaller than a transmittance of a wavelength component in a visible region, and
a second filter having a transmittance of the wavelength component in the infrared region that is larger than the transmittance of the wavelength component in the visible region, and
wherein the first imaging mode inserts the first filter into the lens group, the second imaging mode inserts the second filter into the lens group, and the third imaging mode removes the first filter and the second filter from the lens group.

* * * * *